United States Patent
Lee et al.

(10) Patent No.: US 11,509,612 B2
(45) Date of Patent: Nov. 22, 2022

(54) MODIFYING AN AVATAR TO REFLECT A USER'S EXPRESSION IN A MESSAGING PLATFORM

(71) Applicant: MICROSOFT TECHNOLOGY LICENSING, LLC, Redmond, WA (US)

(72) Inventors: Austin Seungmin Lee, Seattle, WA (US); Amy Mun Hong, Redmond, WA (US); Keiichi Matsuda, Chigasaki (JP); Anthony James Ambrus, Seattle, WA (US); Mathew Julian Lamb, Mercer Island, WA (US); Kenneth Mitchell Jakubzak, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/122,076

(22) Filed: Dec. 15, 2020

(65) Prior Publication Data
US 2022/0191157 A1   Jun. 16, 2022

(51) Int. Cl.
*G06F 15/16* (2006.01)
*H04L 51/046* (2022.01)
*H04L 51/10* (2022.01)

(52) U.S. Cl.
CPC ............ *H04L 51/046* (2013.01); *H04L 51/10* (2013.01)

(58) Field of Classification Search
CPC ..... H04L 51/046; H04L 51/10; H04L 51/066; H04L 51/20; G06T 13/40; G06T 13/80; G06T 11/60; G06F 40/30

USPC .......................... 709/204, 206, 224
See application file for complete search history.

(56) References Cited

U.S. PATENT DOCUMENTS

| | | | |
|---|---|---|---|
| 10,454,857 B1* | 10/2019 | Blackstock | A63F 13/58 |
| 2007/0113181 A1* | 5/2007 | Blattner | G06Q 10/107 |
| | | | 715/706 |
| 2014/0181229 A1* | 6/2014 | Tucker | H04L 51/32 |
| | | | 709/206 |
| 2015/0121251 A1* | 4/2015 | Kadirvel | H04M 1/72427 |
| | | | 715/753 |
| 2016/0110922 A1* | 4/2016 | Haring | H04N 7/157 |
| | | | 345/633 |
| 2016/0359777 A1 | 12/2016 | Tucker et al. | |
| 2017/0206694 A1* | 7/2017 | Jiao | G06T 7/246 |
| 2017/0358117 A1* | 12/2017 | Goossens | H04L 51/10 |
| 2018/0077095 A1 | 3/2018 | Deyle et al. | |

(Continued)

OTHER PUBLICATIONS

"International Search Report and Written Opinion Issued in PCT Application No. PCT/US2021/059041", dated Feb. 18, 2022, 10 Pages.

*Primary Examiner* — Johnny B Aguiar
(74) *Attorney, Agent, or Firm* — Workman Nydegger

(57) ABSTRACT

Systems and methods are provided for facilitating the presentation of expressive intent and other status information with messaging and other communication applications. The expressive intent is based on expressive effect data associated with the message recipients and/or message senders. The expressive intent can be conveyed through avatars and modified message content. The avatars convey gestures, emotions and other status information and the presentation of the avatars can be reactive to detected state information of the message recipient(s), message sender(s) and/or corresponding messaging device(s).

20 Claims, 15 Drawing Sheets

(56) References Cited

U.S. PATENT DOCUMENTS

| | | | |
|---|---|---|---|
| 2018/0253901 A1 | 9/2018 | Charlton et al. | |
| 2018/0336715 A1* | 11/2018 | Rickwald | G06T 13/40 |
| 2019/0130629 A1* | 5/2019 | Chand | H04L 65/1069 |
| 2019/0311331 A1* | 10/2019 | Steinhoff | G10L 15/08 |
| 2021/0176197 A1* | 6/2021 | Al Majid | G06F 40/295 |

* cited by examiner

MODIFYING AN AVATAR TO REFLECT A USER'S EXPRESSION IN A MESSAGING PLATFORM

BACKGROUND

Computers enable many types of communications, including cellular and digital telephone communications, email communications, messaging communications (e.g., short message service (SMS) and multimedia messaging service (MMS)), video chat applications, face-to-face social media applications, and so forth.

Despite the availability of various communication applications, there is still an ongoing need and desire to improve the functionality and flexibility of communication applications for enabling users to communicate in different and more expressive ways.

Some applications provide tools for enabling users to personalize and customize their messaging content. For instance, some applications provide a pallet of selectable emojis, emoticons, images and animations that can be used as standalone or supplemental messaging content. Some applications also enable users to apply stylized templates, anime filters, drawing graffiti and/or other overlays to message images and video content.

One limitation of existing messaging systems, however, is that they are not configured to enable rich expressive context in a manner that is responsive to and/or reactionary to both the status of the message sender and message recipient. For instance, existing systems that present emoticons or other animations do not account for or modify the presentation of the emoticons/animations based on the positioning or status of the recipient. This can limit the participant's ability to effectively convey expressive intent in a timely and effective manner to. Existing messaging systems are also limited in their ability to automatically identify and convey meaningful expressive status information that corresponds directly with the message sender.

In view of the foregoing, there is an ongoing need and desire to enable additional techniques and functionality for enabling systems to convey expressive intent and corresponding status information in a rich and intuitive manner when communicating over messaging platforms and other communication applications and particularly in a manner that is responsive to the detected status/states of the message participants.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments are generally directed towards systems, methods and devices that can be used to facilitate the presentation of expressive intent and other status information with messaging applications and other similar communication applications.

In some embodiments, an avatar is generated and presented with messaging content within a messaging application in a manner that conveys contextual intent/meaning associated with a message sending user and that is ultimately presented on a device associated with a message receiving user. In such embodiments, the message sending user uses a first device to generate, detect and/or send a message and expressive content. The message receiving user uses a second device to render the message and/or expressive content.

A messaging/server system is configured to identify the different devices, users, messages and expressive content and to control generation and presentation of the avatar and/or the messages in a manner to convey corresponding expressive intent.

In some instances, prior to delivering/routing the message to the second device from the first device, the expressive intent of the message sending user is determined, the expressive intent being based at least in part on one or more expressive effects detected from the message sending user contemporaneous with the creation of the message at the first device. The expressive effects can be based on sensor processes and data, manual user inputs, third party data and/or historical user data.

In some instances, a physical status (e.g., eye/gaze positioning status) of the message receiving user relative to the second device is determined. Then, the message and/or the avatar associated with the message sender are caused to be displayed at the second device for the message receiving user. In some instances, the message is presented concurrently with the display of an avatar. In other instances, the avatar is presented independently of the message. In some instances, the avatar is displayed with a delayed timing and/or in a manner to convey the expressive intent of the message sending user and which may be based at least in part on the detected physical status (e.g., eye gaze or positioning) of the message receiving user relative to the second device.

In some related embodiments, an avatar associated with the first user (message sending user) is presented at a device of a second user (a message receiving user) in a manner that conveys an expressive intent and/or expressive effects associated with the first user independent of any consideration of the detected physical status of the second user. The avatar can be presented concurrently with or independent of a message that is generated from the first user/first device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims and/or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
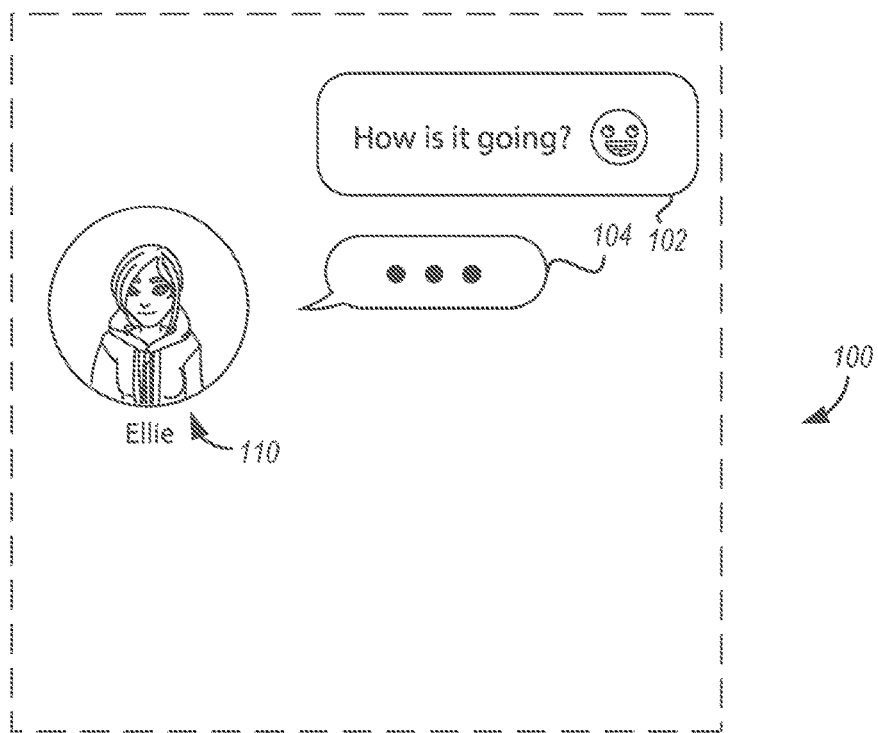
FIGS. 1A-2H illustrate various embodiments of communication application displays in which avatars are presented with messaging content to convey expressive intent between messaging parties.

As mentioned earlier, the disclosed embodiments are generally directed towards systems, methods and devices that can be used to facilitate the conveyance of expressive intent and other status information with messaging and other communication applications.

Technical benefits of the present invention include the ability to convey information, such as expressive intent and corresponding status information associated with the message sender, in messaging applications that was not previously able to be conveyed with messaging applications. Technical benefits also include facilitating functionality to present expressive intent in ways that were not previously possible by using existing messaging tools (e.g., emoticons, filters, etc.), such as by automatically determining an expressive intent based on detected expressive effect data and conveying the expressive intent with avatars.

For example, in some instances, the expressive intent and/or corresponding status information of a message sender is conveyed with an avatar that is configured to animate and/or otherwise reflect the expressive intent and status information of the message sender. The timing and format of the avatar that is presented, as well as the format and timing for presenting contemporaneous messaging content, can also be generated and/or modified to reflect expressive intent to facilitate new and different types of communication techniques for conveying expressive intent.

The various embodiments described herein may be implemented within a MMS (mixed messaging service) or other messaging application/platform, as well as any other communication application that can benefit from the disclosed functionality.

According to the disclosed embodiments, expressive intent may be conveyed concurrently with or independently from messaging content that is transmitted between users using the communication application(s). In some instances, expressive intent comprises an expression of an emotional state and/or physical state based on one or more expressive effects/expressive effect data that is detected as corresponding to one or more of the communication participants.

As used in the disclosure and the claims, the term "expressive effects" should be broadly construed to include any expressive effect data that can be mapped to an emotional and/or physical state of a messaging participant. The expressive effects/expressive effect data may include, for example, one or more physical gestures (e.g., as a movement of a body part, a facial expression, eye movements, gaze, etc.), a user's physical location (e.g., a geographic location, a global positioning system (GPS) location, a relative building or structure location, etc.), a user's presence in a virtual location, and/or a temporal location (e.g., on a conference call, participation in a particular event, etc.).

The expressive effects/expressive effect data may also include, additionally or alternatively, a user selected settings or data that specifies an intended state or status of a user (whether it is an actual state or an incorrect/inaccurate state that is purported).

In some instances, the expressive effects/expressive effect data includes, additionally or alternatively, a profile or historical state/status for a user, as well as detected set of criteria that map to the user profile(s)/historical state(s) (e.g., at a particular time of a day or day of the week, a user is typically asleep, at a particular venue, eating, exercising, participating in a particular event, and/or any other criteria or circumstances).

In some instances, the expressive effects/expressive effect data includes, additionally or alternatively, sensor readings corresponding to a user's physical state (e.g., body position, body movement, gestures, facial expressions, physical location, biometric data/readings like pulse, temperature, chemical balance, sleep state, or other biometric data) and/or emotional state (e.g., level of happiness, sadness, confusion, focus, anger, excitement, or any other emotion).

In some instances, sensors are used by the devices associated with the message participants to gather the expressive effect/expressive effect data. The sensors may include cameras, motion sensors, biometric sensors, temperature sensors, timers/clocks, and other sensors. The data gathered from the sensors may be used by a messaging service/server, along with indexes, stored profiles and expressive effect data, image analysis tools, machine learning tools and other analytic tools to determine the expressive intent of a user at any given time or circumstance and based on the gathered/detected expressive effect data.

In some instances, the sensors are configured to monitor corresponding user device(s) in addition to the user (e.g., by monitoring status information of a user's phone(s), computer device(s), user vehicle(s), wearable device(s) and/or other device(s) associated with the users). Sensor data detected from a user device can be used to infer and/or identify a physical/GPS location associated with the user, a virtual location associated with the user, a state of emotion of the user, and/or simply the status of the user device(s). Any detected status information can be conveyed with an avatar associated with a message participant to convey expressive intent. The manner in which the avatar is presented can also be generated and/or modified based on the detected expressive effect data of one or more of the message participants to convey expressive intent during the communications between the message participants.

Some non-limiting examples of conveying expressive intent within messaging applications, according to the disclosed embodiments, will now be described in reference to the appended figures.

Attention will first be directed to FIGS. 1A-2H, which illustrate various embodiments of communication application displays in which avatars are presented with messaging content to convey expressive intent between messaging parties. In these embodiments, each of the message participants can be considered message senders, as well as message recipients, depending on the timing in which the messages are sent and the directional transmission of the messages.

For instance, as shown in FIG. 1A, a display 100 is illustrated that corresponds to a first party comprising a message recipient (at a particular point in time in which a second party is generating a message to send to the message recipient).

The display is currently rendering an avatar object 110 that comprises an avatar associated with a second party (e.g., a message sender), as well as a message object 104 that is currently rendering three ellipses to convey a state in which the message sender (the second party) is typing or creating a message to be sent to the message recipient. Display 100 also includes a second message object 102 that contains a previously sent message (e.g., a message previously sent by the first party/message recipient when they were a message sender at an earlier point in time), and to which the second party/message sender is currently responding.

The use of ellipses in messaging, such as shown in message object 104, is known in the art and it utilized by conventional systems to convey limited state information about the message (e.g., that a message is being prepared). Such information, however, is limited and does not convey rich expressive intent information, like emotional states and other user state information associated with the message sender (other than they may be creating a message to send).

In the current embodiment, the avatar is used to convey expressive intent associated with the message sender (beyond information that reflects whether a message sender is creating a message to send) and which can be presented independent of and/or concurrently with the message that is being created/sent by the sender (e.g., the message that will ultimately replace the ellipses in message object 104). In some instances, the expressive intent is presented with the avatar shown in the avatar object 110. The manner in which the avatar is presented (e.g., positioning, styles, attire, animations, accessories, coloring, size, etc.) will be responsive to and/or based on state information associated with the message recipient and/or message sender.

Before adding more descriptions on this topic, it will be appreciated that the message participants and/or organizational administrators associated with the participant device(s) and messaging application(s) will have control tools provided for controlling the privacy settings that are used to enable, restrict and/or otherwise manage which expressive intent data is conveyed and/or gathered and used to facilitate the disclosed embodiments. This will ensure that the functionality of the disclosed embodiments will not violate any personal, government or corporate privacy rules/preferences. These settings (not shown) can be accessed through one or more menu options that are presented with the messaging application(s). In some instances, the menu options are accessible through a menu interface, such as a selectable tools icon or other selectable user interface (UI) object shown in FIG. 4.

Now, returning to FIG. 1A, a message sender may have certain physical states that are detected with sensors on the sender's device or auxiliary devices that are used to generate or modify a corresponding avatar, based on mappings between the avatar presentation formats and the detected sensor data. In this manner, the avatars can be generated or modified to reflect a corresponding positioning, movement, gesture, facial expression, pose or other state associated with the corresponding user (e.g., the message sender). In some instances, an avatar can also be presented within the messaging display that corresponds to the message recipient.

The avatar presentation will correspond, in some instances, to the state or status of the message recipient. For instance, if it is determined that the message recipient is not looking at the display 100 or has moved to the side of the display 100, the message sending avatar's pose/position may be modified to respond to the position of the message recipient, relative to the message recipient device/display 100. For instance, in FIG. 1A, the avatar object 110 has an avatar with eyes looking straight forward, reflecting that the message recipient is looking at the display 100. In contrast, as shown in FIG. 1B, the avatar object 120 has an avatar that has been generated and/or modified from a previous presentation to now have eyes that are looking to one side of the display, matching a detected positioning of the message recipient (not shown), relative to the display 100, as detected by sensor data at the message recipient device.

Figure 1B:
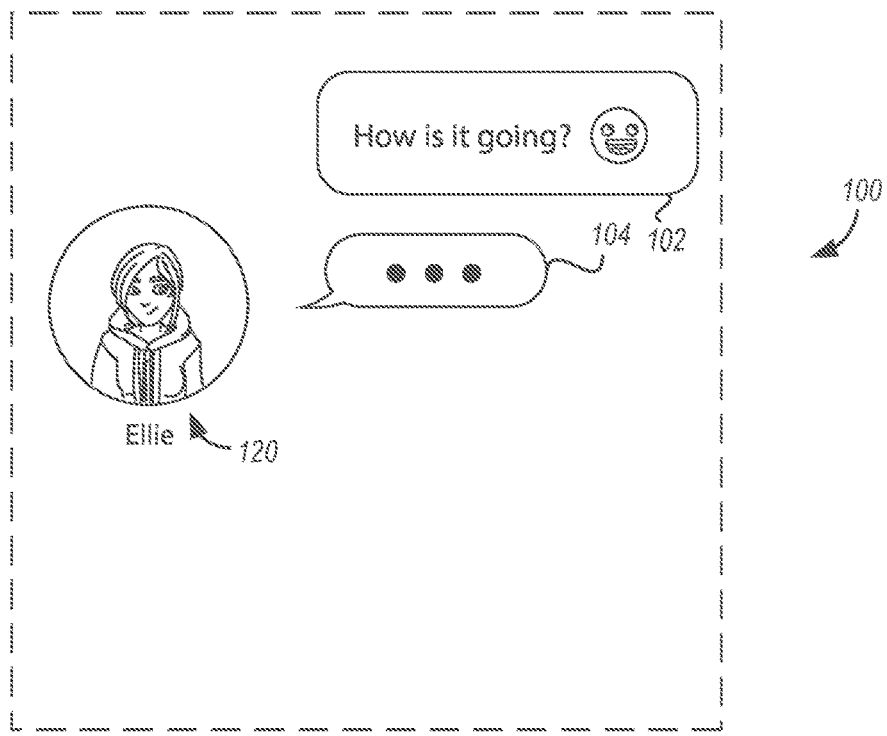
Figure 1C:
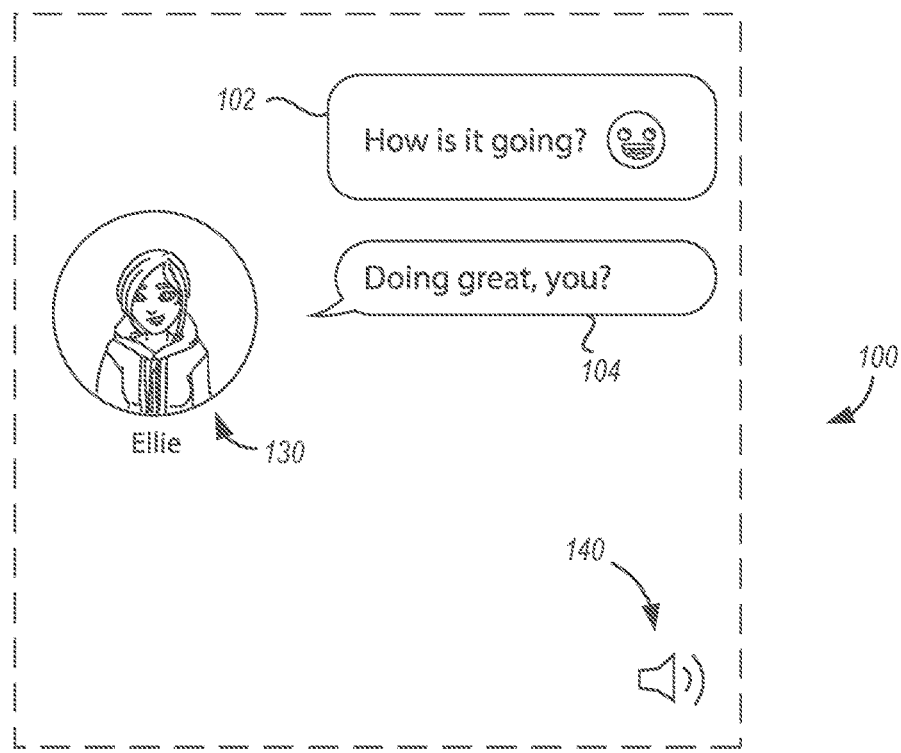

The avatar is further presented in FIG. 1C, within avatar object 130, at a subsequent time to the presentation in FIG. 1B, with eyes looking straight ahead, and which corresponds to the detected positioning of the message recipient. In some instances, the rendering of the avatar in this format is delayed until it is determined that the message recipient is looking at the display and/or is positioned to view the display. Then, the presentation of the avatar is dynamically generated and/or modified from a first format to a new format based on detected changes in state/status information of the message recipient.

Similarly, the message in message object 104 can also be rendered in a manner that is dynamically based on a state of the message recipient (e.g., displaying the message content after determining the message recipient has changed their gaze/positioning from a first position relative to the display to a second position).

In some instances, the presentation of the avatar and/or message will include rendering the message in an audible format, as reflected by speaker object 140. When the message is rendered audibly, the audio can comprise recorded audio from the message sender and or machine generated text-to-speech audio. The style, timber, prosody, volume and/or language used for rendering the audio may also vary based on detected expressive effect data associated with the message sender and/or message recipient, such that different expressive effect data will corresponding with different voice profiles for causing the audio to be rendered with different style(s), timber(s), prosody(s), volume(s) and/or languages of the different voice profiles.

Using different voice profiles is one manner for conveying expressive intent. In some instances, when rendering the audio format of the message, the avatar can be animated to simulate the speaking of the message by the avatar, with facial expressions and gestures that match the timber, prosody, style and/or language of the voice profile that is used to convey the message audibly.

Figure 1D:
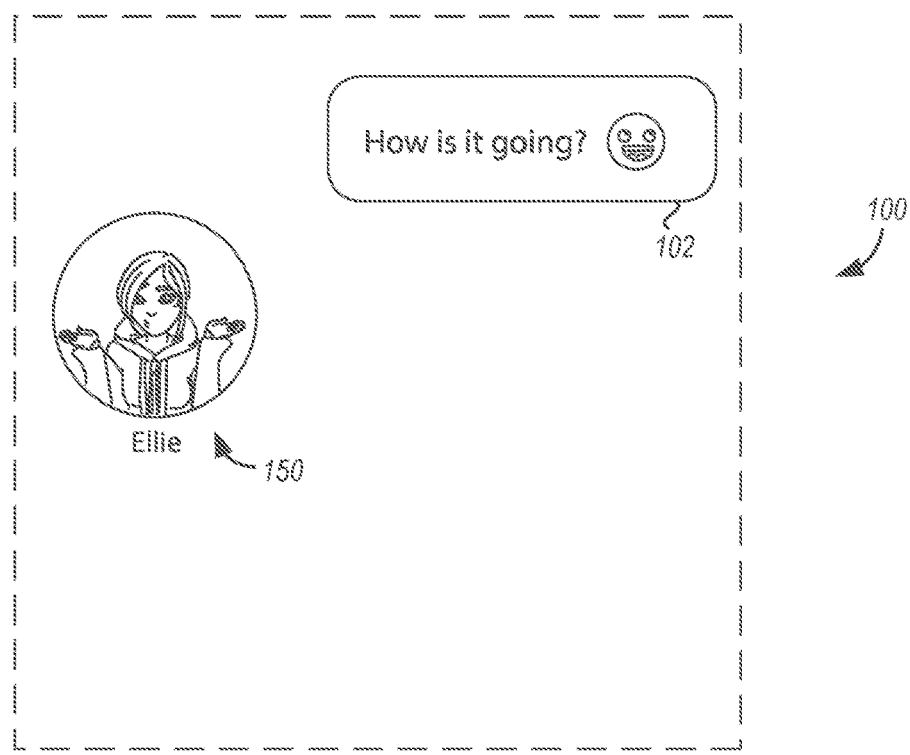

Attention will now be directed to FIG. 1D, which illustrates a related embodiment in which the avatar in the avatar object 150 is conveying expressive intent with a gesture or pose (e.g., a shrug). This pose/gesture can be a static image and/or an animation. In some instances, the gesture/pose is dynamically generated/presented in a manner that is temporally contemporaneous with a detected gesture being made by the message sender, such as may be detected with sensors of the message sender device. The avatar gesture/pose may be the exact same gesture/pose that is detected of the message sender (e.g., tracking to body movements of the message sender), or the gestures/poses may not be exact but only correlated through mappings of similarity based on detected user body movements and one or more stored avatar gesture profiles that correspond to the detected user body movements.

In other embodiments, the gesture is automatically selected and presented in response to the message presented in message object 102, based on historical/profile data associated with the message recipient (e.g., a historical profile that reflects the message recipient often shrugs when presented with similar questions).

In yet other embodiments, the avatar pose/gesture is based on a user selected avatar gesture from a user interface, such as will be described in more detail with reference to FIG. 4.

In some embodiments, the avatar is presented instead of and/or along with a messaging object that conveys the message recipient is working on generating a reply message (e.g., such as the message shown in messaging object 104 of FIG. 1C).

Figure 2A:
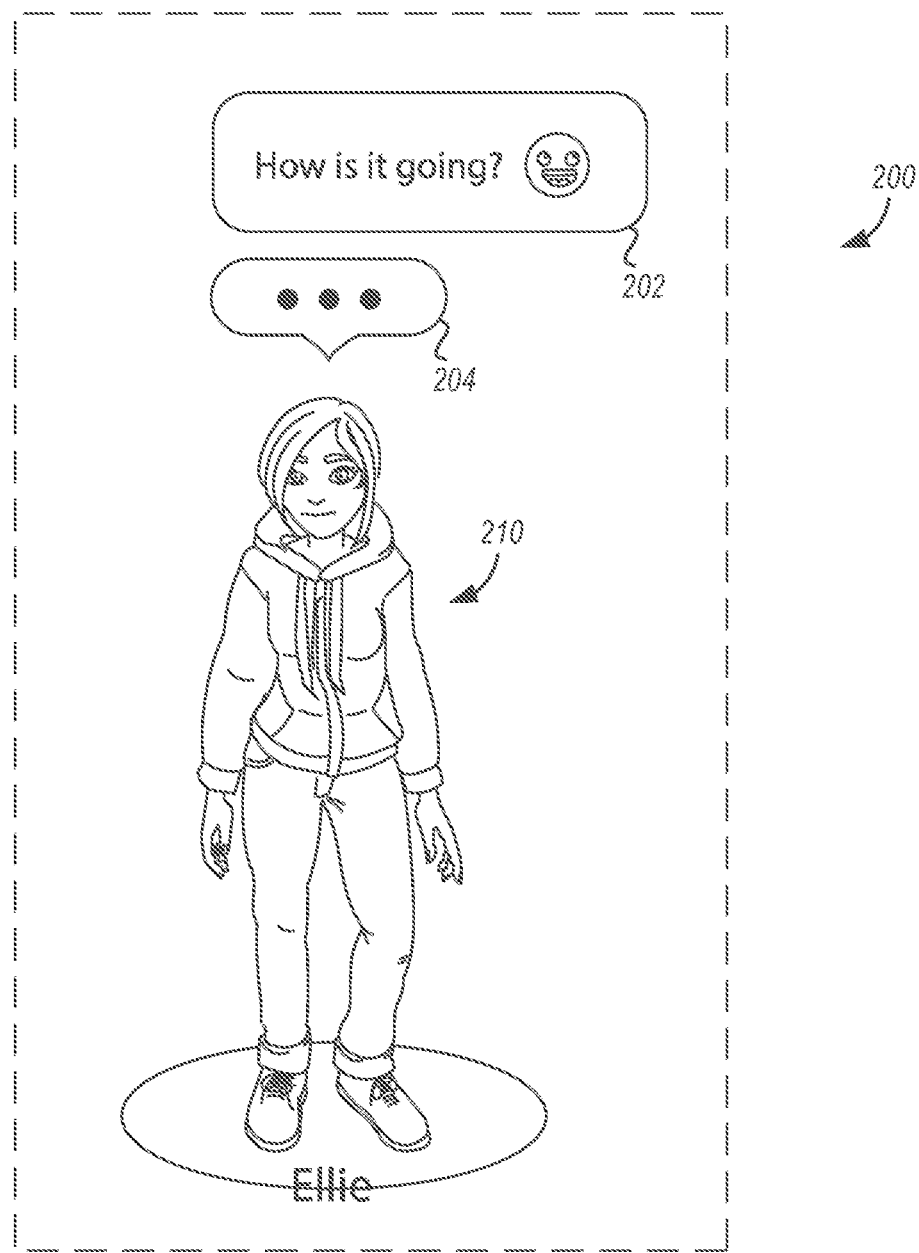

Attention is now directed to FIG. 2A, which illustrates another embodiment of a display 200 of a messaging application and which is presently rendering an avatar object 210 along with a first messaging object 202 and a second messaging object 204. This display 200 is similar to the display embodiments described in reference to FIGS. 1A-1D. The difference is that the avatar object 210 comprises the full body of an avatar associated with the message sender. The pose and positioning of the avatar conveys expressive intent mapping to the detected expressive effects described earlier. In this embodiment, however, additional expression can be conveyed by using the different portions of the avatar body to convey expression. For instance, the manner in which the avatar is standing, sitting and/or moving their torso and legs/feet can convey different emotional and/or physical states. By way of example, a tapping foot may convey impatience. The quick bending and extensions of the legs and/or jumping may convey excitement, particularly when paired with facial expressions that match, and that correspond to the detected expressive effect data/status data of the message participant.

Figure 2B:
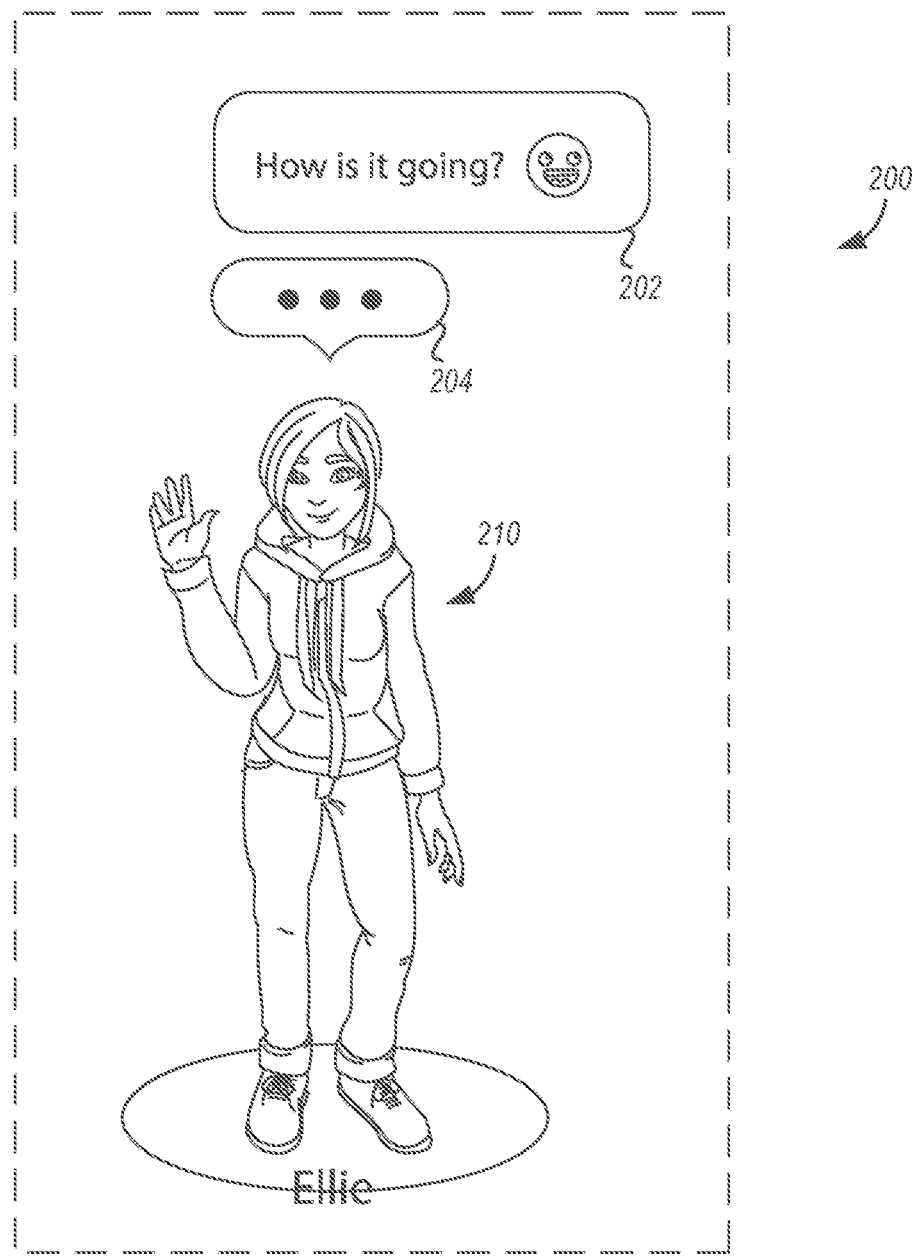
Figure 2C:
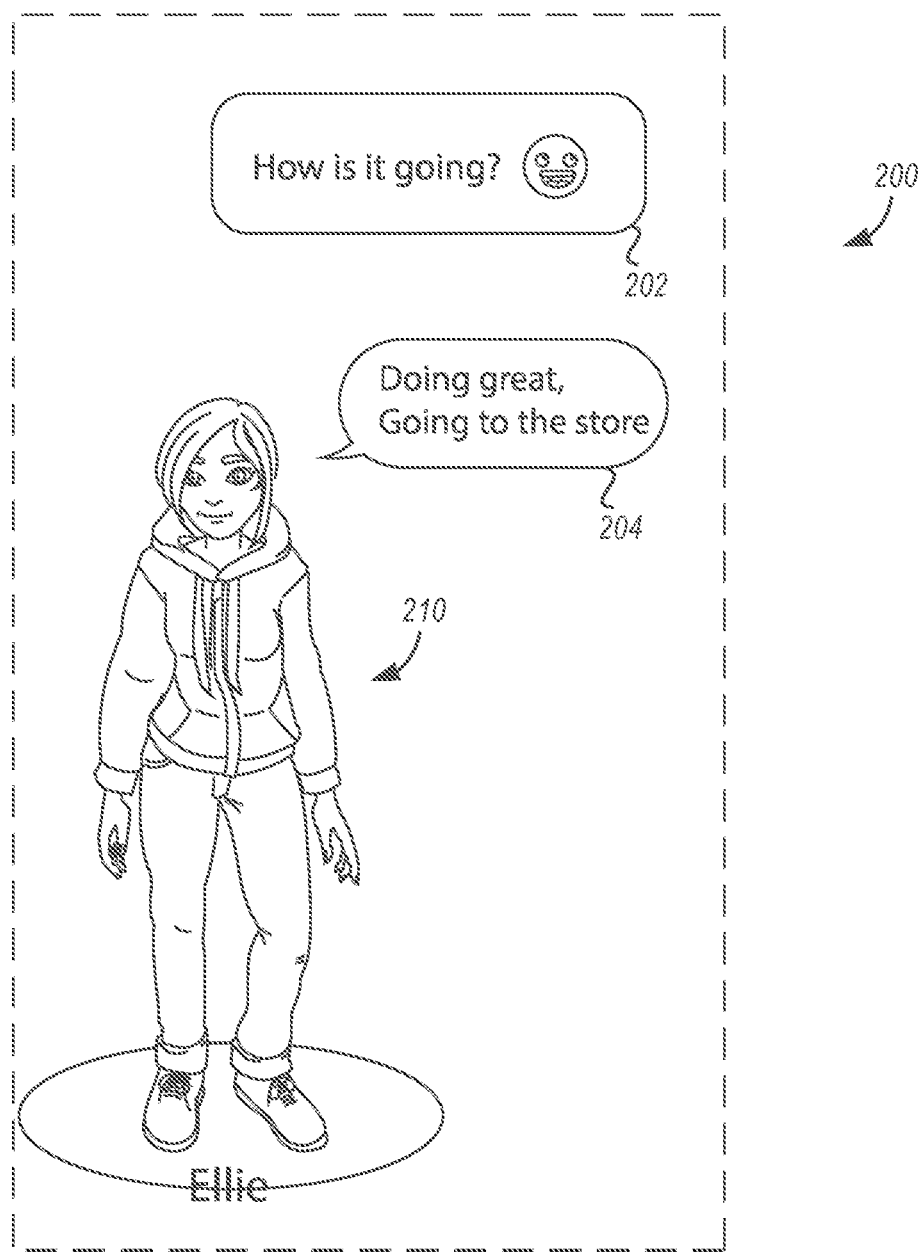
Figure 2D:
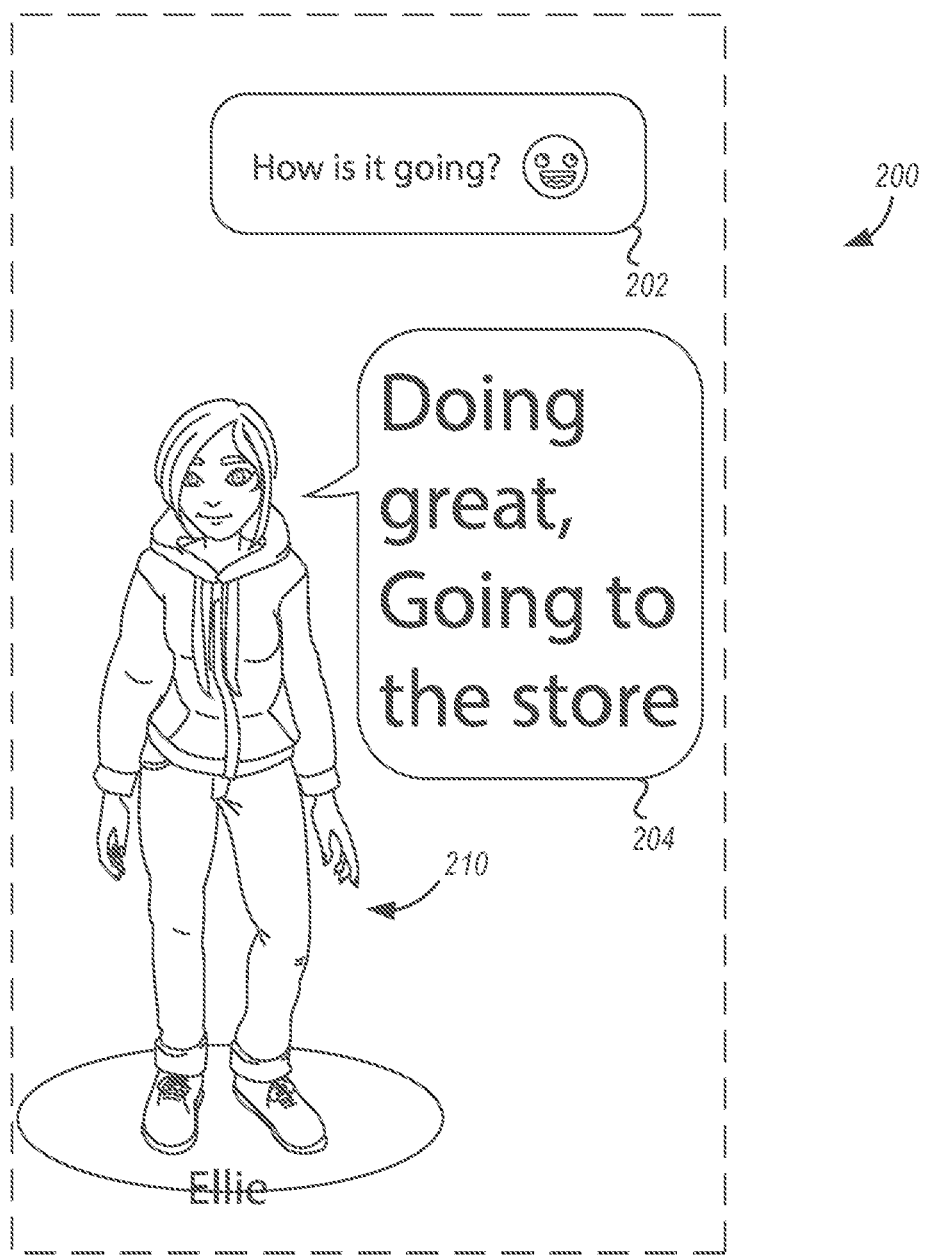

FIG. 2B illustrates a similar display, however, in this embodiment the avatar is waving, while the avatar shown in FIG. 2A is not. The wave pose/gesture may be automatically selected based on the detected pose/movement of the message sender, or alternatively based on expressive effect data other that detected pose/movement of the message sender and/or based on manually entered user input that is entered into a messaging device of the message sender.

In some instances, the avatar format, including the avatar animation/gesture, is presented dynamically in response to detecting that the message recipient is looking at the display. This timing can be particularly beneficial for eliminating unnecessary rendering processing/power when the message recipient is not looking at the display.

In some alternative embodiments, the gesture/pose of the avatar is only temporarily presented to dynamically correspond with matching temporal expressive effect data detected for the message sender, irrespective of the positioning and/or other state/status of the message recipient.

Similarly, the timing and format of the message (shown in message object 204) may be presented independently of any consideration of the message recipient status. Alternatively, the timing and/or format for presenting the message (e.g. within message object 204) may be based directly on the detected status/state of the message recipient. For instance, the font of the message in message object 204 in FIG. 2C may be selected to correspond with a preferred font size given a message participants first position/location relative to the display 200 and to facilitate reading of the message. In contrast, for a second/different determined position of the message participant relative to the display 200, e.g., from a further distance that in the first position, the message font may be enlarged to facilitate reading of the message at the further distance.

The positioning of the message recipient may also automatically trigger rendering of the message in a different font, style, language, and/or other format (even an audio format with particular audio attributes) corresponding to different positioning or other message recipient state/status (e.g., location, events occurring at the same time, ambient light, noise, settings or type of the recipient messaging device, etc.). The size and positioning of the avatar on the display can also be varied to accommodate/match different mappings of message recipient states/status information.

In some instances, the presentation of the avatar and/or message will be automatically generated to convey actual expressive intent, independent of user input from the message sender, even when the message sender is not actively engaged in using the messaging application and/or does not have the messaging application open on their device. This may occur, for example, based on detected expressive effect data associated with the user. This data may include detecting the messaging application is not open or being used by the message sender. This data may also include historical profile data, sensor data, third party data or other data that is used to determine a particular state of the message sender.

Figure 2E:
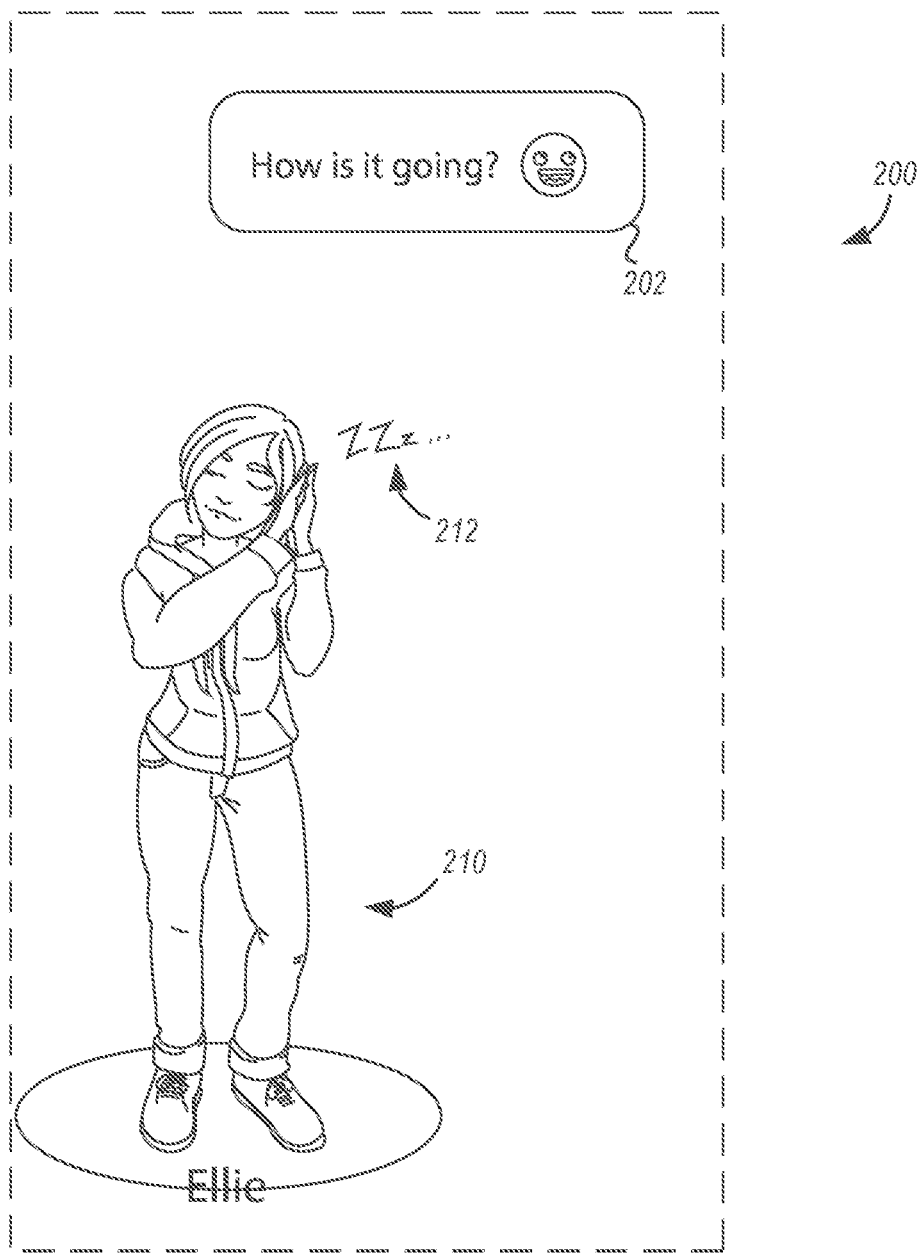

In one non-limiting example, shown in FIG. 2E, an avatar is presented to reflect the message sender is asleep or tired, along with a textual message or expression 212 to further convey expressive intent. This presentation of the avatar may be automatically generated based on actual detected sensor data (e.g., biometric pulse and/or breathing data of the message sender detected from a wearable device as well as location data corresponding to the user's bedroom or a hotel and timer/clock data reflecting a time in the middle of the night).

In an alternative embodiment, this avatar presentation is based on a user input selected on their messaging user interface to convey they are tired or want to sleep. This expressive intent may match actual feelings of the user (e.g., it is a truthful conveyance of an actual emotional/physical state). The avatar presentation may also be selected to convey a false or inaccurate expression of emotional/physical state. (e.g., the message sender may select this avatar image/animation to be presented even though they are not sleeping or tired at all).

Figure 2F:

FIG. 2F illustrates another embodiment in which the expressive intent conveyed by or with the avatar includes physical status or location information, such as a geographical/regional presence of the message sender. This presentation may be based, for example, on detected GPS data associated with the message sender's device (e.g., located somewhere in France), such that the avatar is generated with and/or modified to include attire (e.g., hat 214 and flag 216) corresponding to the detected location of the message sender. Additional objects, such as object 218 that is currently representing the Eiffel tower, can also be presented with the selected avatar presentation format to correspond with the detected expressive effect data (e.g., location data), even though the message sender may not be in visible proximity to the represented object (e.g., Eiffel tower). It is nonetheless automatically selected and presented, in some embodiments, to further convey expressive intent in a manner that is possible with traditional messaging systems.

Figure 2G:
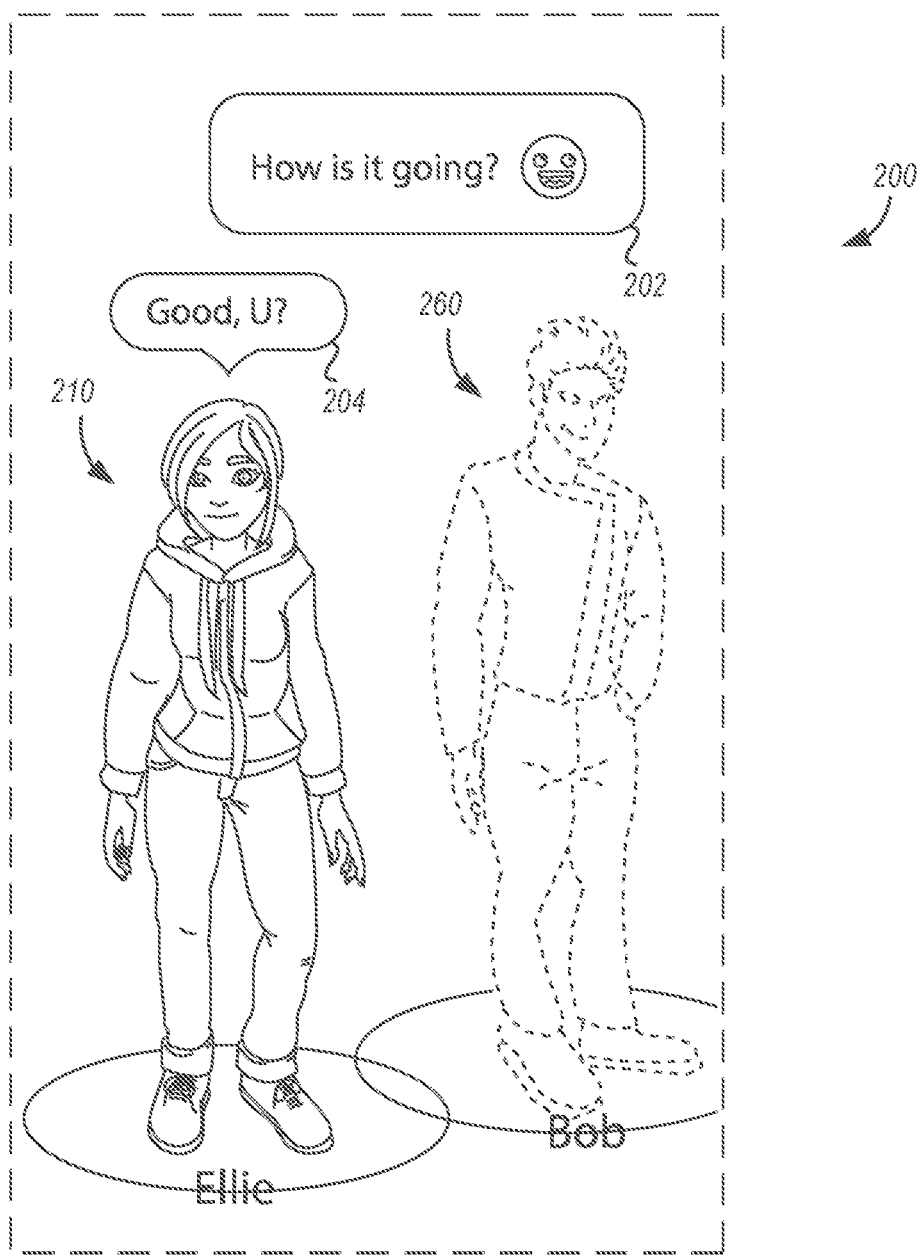

FIG. 2G illustrates another example in which additional/supplemental expressive intent information can be conveyed with an avatar in messaging applications. In this embodiment, the avatar represented by avatar 210 corresponds to the message sender. In this display an additional avatar object 260 is presented which corresponds to a different person who is detected as being physically proximate the message sender (either physically proximate and/or circumstantially/temporally proximate such as participating in a common event). In this embodiment, sensor data gathered from the message sender device and/or a third-party device (e.g., the device of Bob) or another third-party system (e.g., a venue/event device) can be used to identify the determined proximity.

When one or more third party avatars are presented concurrently with the avatar of the message sender, the presentation formats of the different avatars may be presented differently to convey different expressive intent/ importance (e.g., object 260 is presented with a different transparency, size, persistence and/or other format than the avatar of the message sender avatar object 210).

Figure 2H:
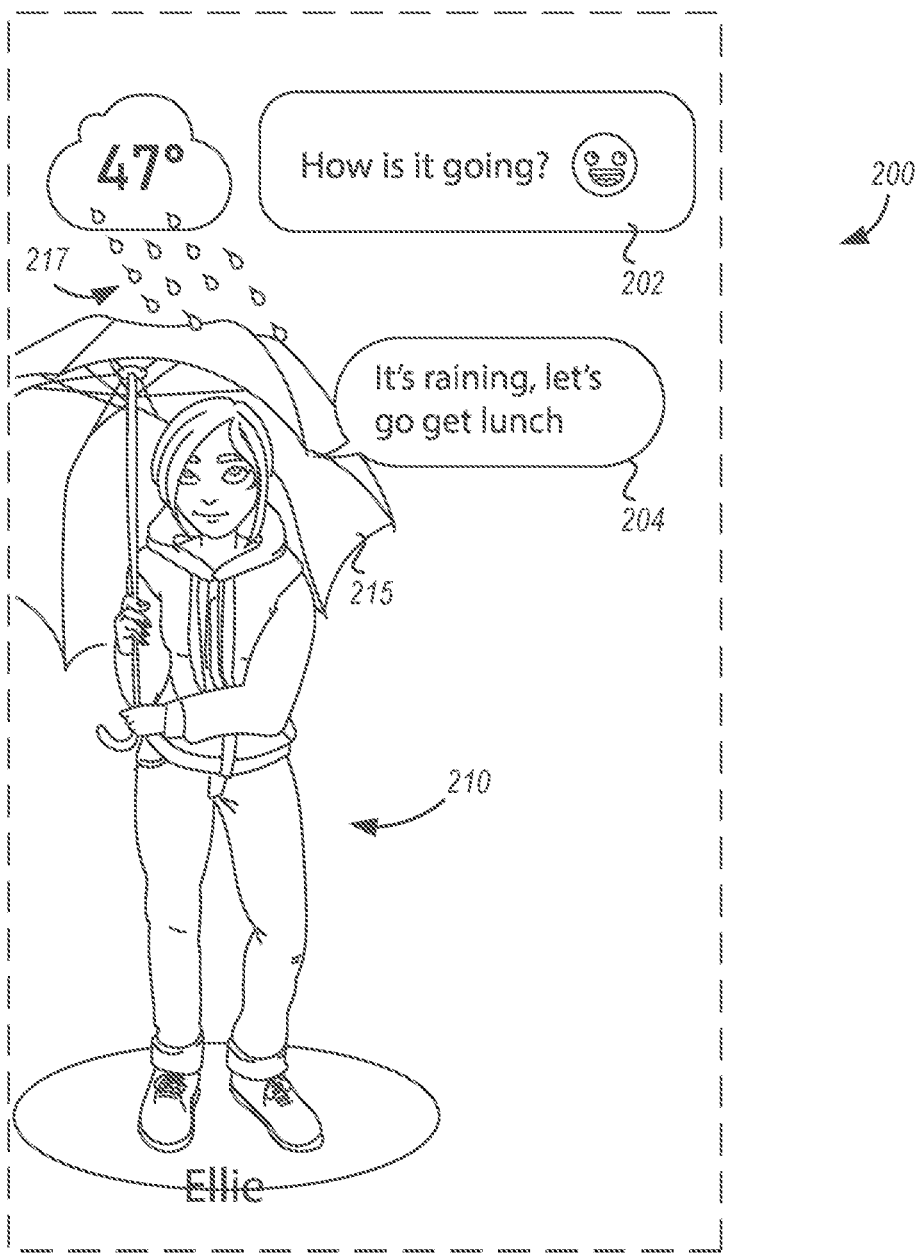

FIG. 2H illustrates another embodiment in which expressive intent is conveyed with the use of an avatar and corresponding visualizations. In this embodiment, the avatar is presented with an umbrella 215 and a weather visualization 217. In this embodiment, the weather visualization and umbrella are automatically generated in response to detecting corresponding expressive effect data associated with the message sender. For instance, third party weather data can be identified for a detected location/presence of the message sender where the weather is occurring (e.g., it is determined it is raining where the user is located).

In some embodiments, the avatar presentation format is selected/used whether the message sender is inside or outside and irrespective of whether the user is holding an umbrella in the rain.

This presentation format of the avatar may also be based on a user selection of an avatar presentation from a plurality of avatar presentations to convey a desired expressive intent.

In another embodiment, this presentation is automatically generated in response to the user typing the text "It's raining, let's go get lunch" in the message that is being sent and in response to one of the systems/devices used for generating, transmitting or rendering the message automatically identifying the term raining and generating/modifying the avatar to be rendered with the presentation format that is shown.

Figure 3:
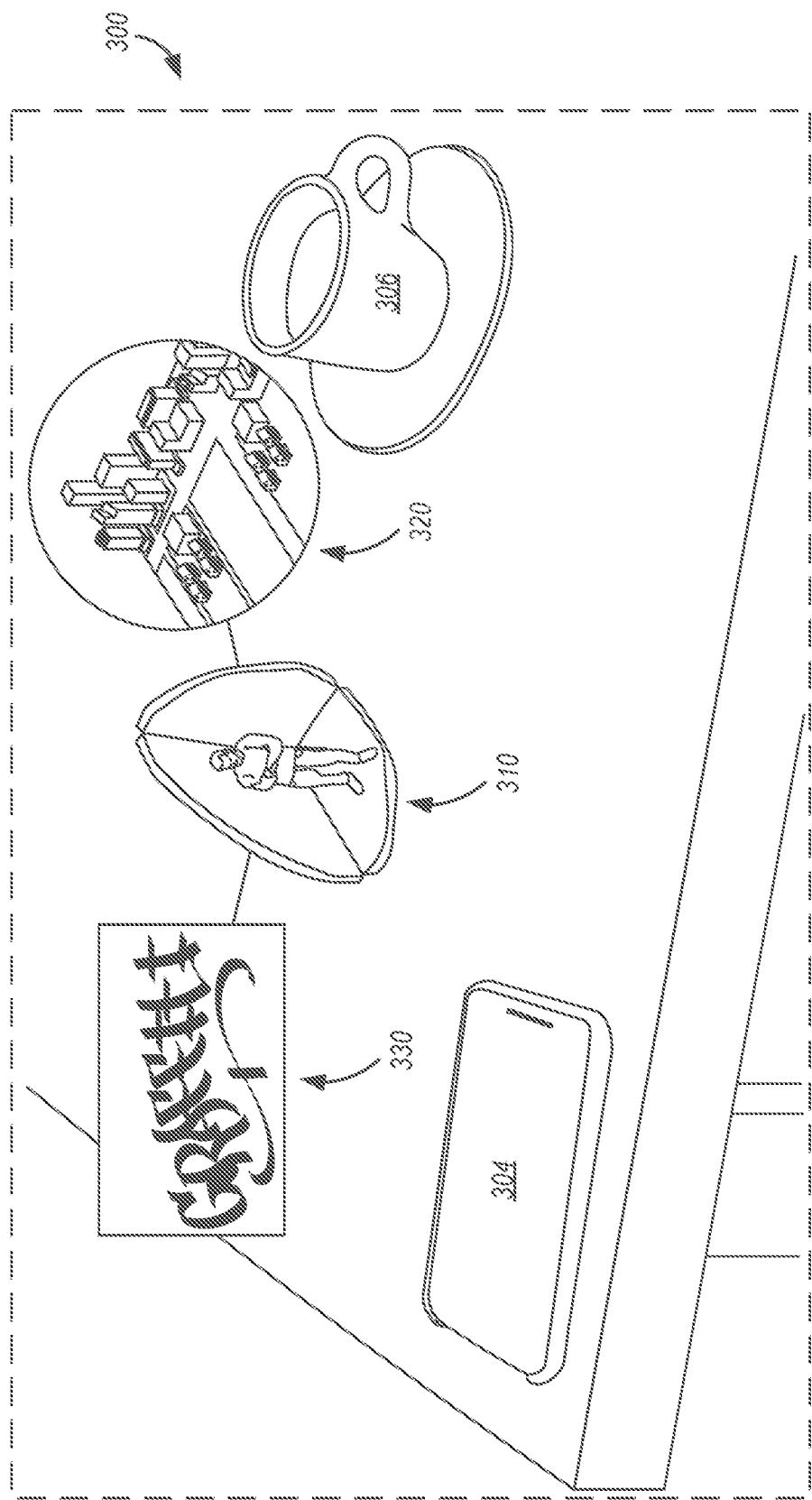
FIG. 3 illustrates an embodiment in which an avatar is presented within a mixed-reality environment in a manner to convey expressive intent.

Attention will now be directed to FIG. 3, which illustrates a mixed-reality environment 300 in which a virtual hologram avatar object 310 is presented in a real-world space (e.g., on a table where a phone 304 and a cup 306 are resting). The presentation of the avatar hologram object is in a format to convey expressive intent. In this embodiment, for example, the avatar shown in the avatar hologram object 310 has his arms crossed and a head bowed, to convey a pensive, serious or somber emotional state that is determined to be associated with a message sender based on detected effective effect data/status data associated with the message sender.

The avatar hologram object 310 is also presented concurrently with other expressive intent information, such as a location information within a virtual world that is associated with the message sender or a different avatar associated with the message sender (e.g., a corner where a corresponding virtual avatar associated with the message sender is located within a virtual world).

Additional information identifying the virtual location can also be presented in a hologram window 330, which may display graffiti or other features, labels, or information specifying the virtual location associated with the message sender. The virtual location information is obtained from an application running on a device associated with the message sender or from a third-party entity that hosts the virtual world.

In some embodiments, the avatar is also presented concurrently with other expressive intent information, such as hologram object 320 that identifies a real-world location associated with the message sender (e.g., the city or industrial park shown in object 320). The image representing the physical location in the real-world can be obtained from a third-party data base in response to a query for images associated with the location determined to be associated with the message sender, based on location data obtained from sensors or other expressive effect data that is identified and determined to be associated with the message sender and physical location.

In some instances, the avatar shown in avatar object 310 will operate similar to the aforementioned avatars, to dynamically change presentation format in response to detected expressive effect data for conveying expressive intent associated with the message sender. This may include animating the avatar, performing gestures or body movements or poses with the avatar. This may also include rendering messages with the avatar. Although not shown, for example, a message from the corresponding message sender can be rendered through or concurrently with the avatar, via audio and/or visual presentations of textual representations of the message. The timing and formatting of the messaging content and the avatar presentation format(s) will also dynamically depend on detected state/status information associated with the message recipient and/or message sender, as previously described.

Figure 4:
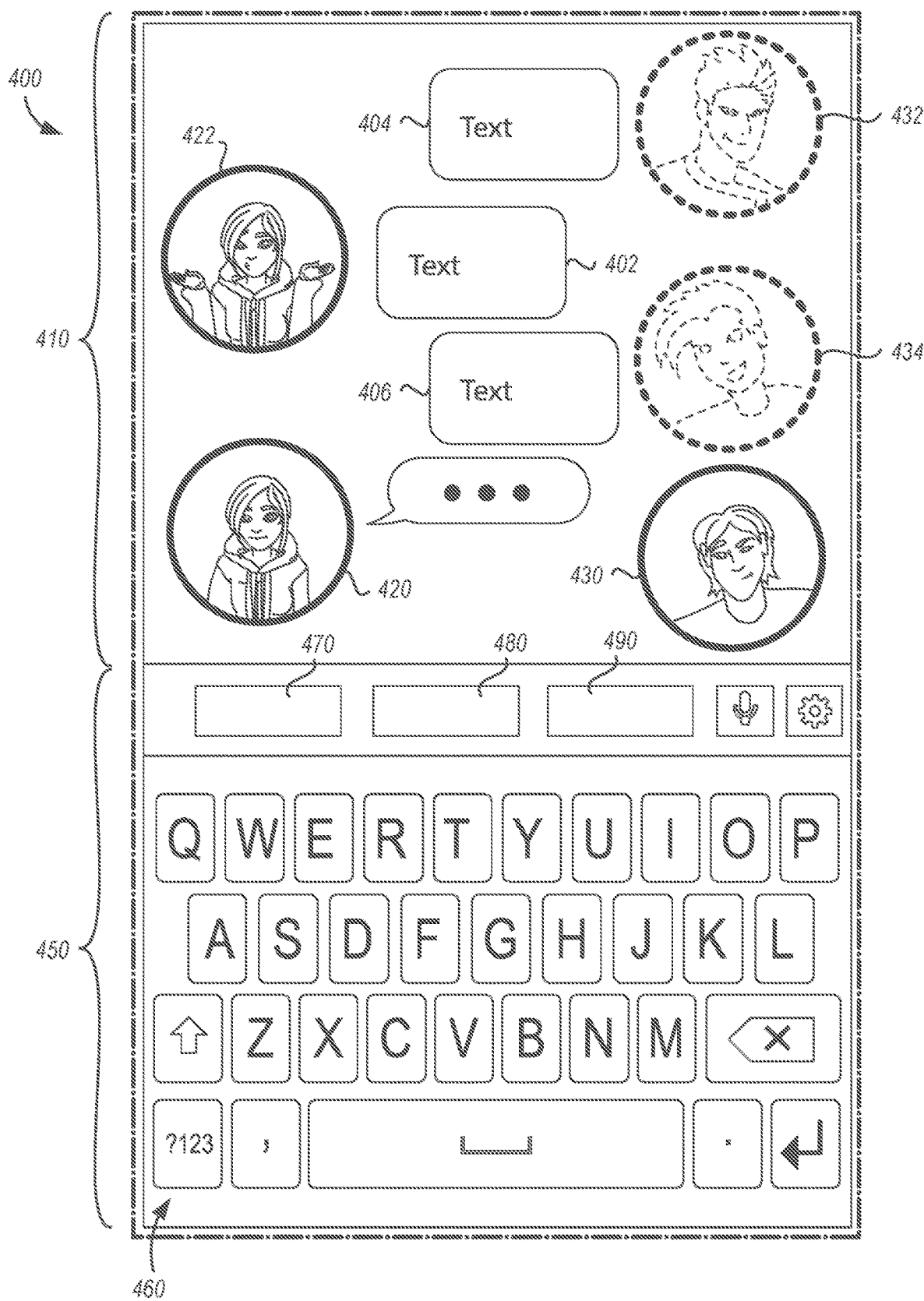
FIG. 4 illustrates one embodiment of a user interface display with messaging content, avatars, and interface tools that may be used to convey expressive intent.

Attention will now be directed to FIG. 4, which illustrates one embodiment of a user interface display 400 with a first display portion 410 and a second display portion 450. In this embodiment the second display portion 450 includes a touch keyboard interface 460 for receiving user input to type a message to be transmitted from a message sender to a message recipient, as well as selectable tools for recording audio and/or to access control menus (such as privacy controls and avatar display preferences).

The interface also includes selectable control objects, such as control object 470 that is operable, when selected, to open a separate window or display of a plurality of selectable avatar expressions, animations, display formats or other contextual/expressive effect data, and the interface can display messaging content, avatars, and interface tools that may be used to convey expressive intent.

Other control objects 480 and 490 can be selected to access menus of selectable GIFs or other animations and images.

The top portion 410 of this display 400 illustrates another non-limiting example for presenting avatars in formats to convey expressive intent. In this embodiment, for example, a first participant is associated with avatar objects 422 and 420. One or both of the avatar objects 420 and 422 may be used to covey expressive intent corresponding to different circumstances and instances of time associated with the first message participant. In some instances, a copy of the avatar expressive intent is recorded with contemporaneous messages. For instance, avatar object 422 may be a recorded image/animation that is contextually relevant to the circumstances and/or temporal timing of message recorded in message object 402.

Similarly, avatar objects 430, 432 and 434 may be associated with a different set of one or more second message participants. The formatting of the different avatar objects may vary between different participants to intuitively convey additional context/information. The avatar objects may also be presented differently depending on whether they are recorded/old avatar objects or whether they are rendering live expressive intent associated with the corresponding message participant(s). For instance, avatar object 430 may be rendering dynamic/real-time expressive intent/content, while avatars 432 and 434 are rendering old expressive intent/content associated with corresponding temporal messages rendered in adjacent message objects 406 and 404, respectively.

Figure 5:
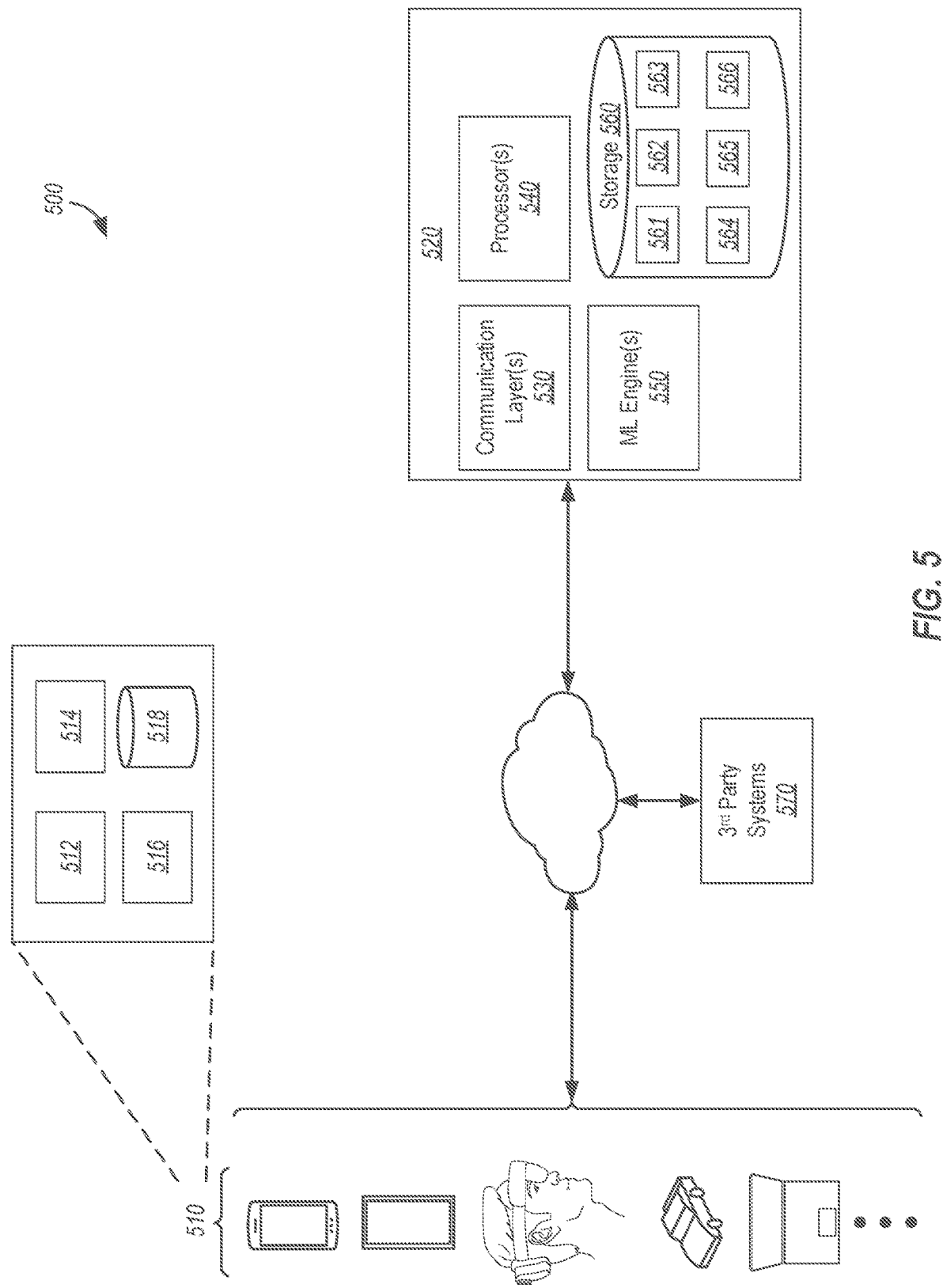
FIG. 5 illustrates an embodiment of a computing environment that comprises and/or that may be used to implement aspects of the claimed invention.

Attention is now directed to FIG. 5, which illustrates an embodiment of a computing environment 500 that comprises claimed systems and/or that may be used to implement aspects of the described and claimed methods.

As shown, a messaging server system 520 is in communication with one more messaging devices 510 (e.g., mobile phone(s), HMD (head-mounted display) device(s), vehicle(s), laptop(s), desktop(s), game console(s) or any other messaging capable device(s)), as well as one or more third-party systems 570 (e.g., weather service systems, virtual game host systems, authentication systems, enterprise directory systems, GPS/mapping systems, machine learning processing systems, avatar repository systems, behavior/profile analytics systems, message systems, health and/or medical record systems, traffic and/or vehicle telemetric/analytic systems and/or any other systems capable of analyzing and/or providing expressive effect data associated with the messaging participant(s) associated with the messaging device(s) 510).

Each of the messaging devices 510 is configured with one or more sensors, such as, but not limited to cameras, microphones, temperature sensors, pressure sensors, vehicle or device telemetric sensors, accelerometers, gyroscopes, inertial movement sensors, biometric sensors and/or any other sensors that are capable of detecting, identifying and or analyzing expressive effect data associated with the messaging participant(s) associated with the messaging device(s) 510).

Each of the one or more messaging device(s) 510 also include one more storage device(s) 514 that store expressive effect data and computer-executable instructions from the messaging server system 520 to implement the disclosed functionality, as well as the messaging application(s), interface(s) and/or messaging data and/or avatar images/animations transmitted with and/or rendered by the messaging application(s) in accordance with the disclosed embodiments.

The messaging device(s) 510 also include one or more hardware processor(s) that are operable to execute the computer-executable instruction stored in the storage device(s) 518 to implement the disclosed messaging device(s) 510 functionality.

Finally, the messaging device(s) 510 also include input/output hardware 518 and corresponding drivers to facilitate the disclosed functionality. The output hardware, may include, for example, hardware devices such as speakers, display devices, haptic feedback devices and so forth for rendering output like the disclosed messages, avatars and/or other expressive intent/content. The input hardware may include hardware such as a mouse, touch screen, keyboard, microphone and so forth for receiving user input, such as expressive effect content comprising user input manually entered at the messaging device(s) 510 and/or messaging content typed, drawn, vocalized or otherwise entered at the messaging device(s).

The messaging server system 520 also includes one or more communication layers 530 (which may also be distributed and shared with the messaging device(s) 510) to facilitate the encoding, routing and/or transmission of messages between message participants/messaging device(s) 510, along with avatar data and other expressive effect data, as well as the transmission of executable instructions to the messaging device(s) 510 to perform the disclosed functionality for generating/modifying the avatars and messages based on detected expressive effect data. In other instances, the messaging server systems generates and modifies the avatars and message based on the detected expressive effect data and transmits the avatar/messages determined to convey the expressive intent associated with the expressive effect data when appropriate.

The communications layer(s) 530 also obtain the expressive effect data from the messaging device(s) and/or third-party system(s) 570. This information may be received in a push and/or pull scheme, as configured in system settings, such as by polling devices/systems for information that appears relevant to a particular event, such as a received message or detected device/user state, and/or based on a periodic interval for polling for state/status information.

The messaging server system 520 may also include one more machine learning (ML) engine(s) 550 to perform analytics on the detected expressive effect data (e.g., state/status information), as well as to generate rules and instructions for controlling the presentation timing and formats of the avatars/messages at the messaging device(s) 510 in a manner that conveys expressive intent associated with the detected expressive effect data.

The messaging server system 520 also includes one or more storage devices that store executable instructions 561 that are executable by the one or more hardware processor(s) 540 to implement the disclosed functionality of the messaging server system 520. The storage 560 also stores privacy rules 562, profiles (e.g., user, avatar, voice profiles) 563, historical use data 564, avatar presentation templates, animations and images and other expressive intent content 565, expressive effect data and corresponding status/state information 566, and indexes for mapping the expressive effect data to the various profiles and avatar presentation templates, animations and images and other expressive intent content that are used to implement the disclosed functionality of the described and claimed embodiments.

The following discussion now refers to a number of methods and method acts that may be performed to implement aspects of the disclosed embodiments. Although the method acts may be discussed in a certain order or illustrated in a flow chart as occurring in a particular order, no particular ordering is required unless specifically stated, or required because an act is dependent on another act being completed prior to the act being performed. Additionally, each of the referenced acts is not required for all implementations of the disclosed embodiments. For instance, some implementations of the disclosed embodiments omit one or more of the recited act and/or include other acts that are not shown. Implementations of the disclosed embodiments also include execution of one or more acts referenced in FIGS. 6 and/or 7.

Figure 6:
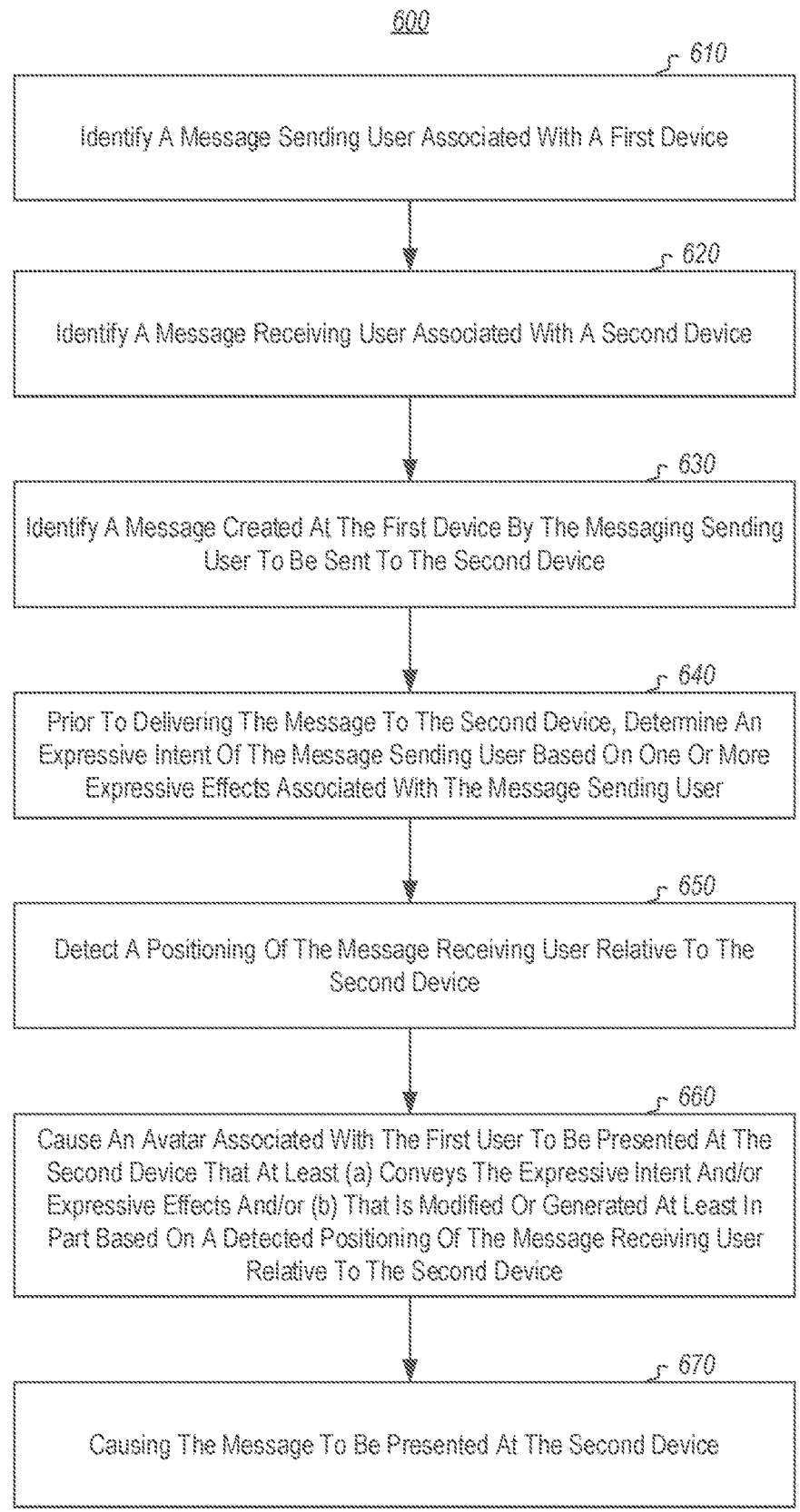
FIGS. 6 and 7 illustrate flow diagrams having act associated with methods of the disclosed embodiments and that may be implemented using computing systems described in reference to the computing environment shown in FIG. 5.
Figure 7:
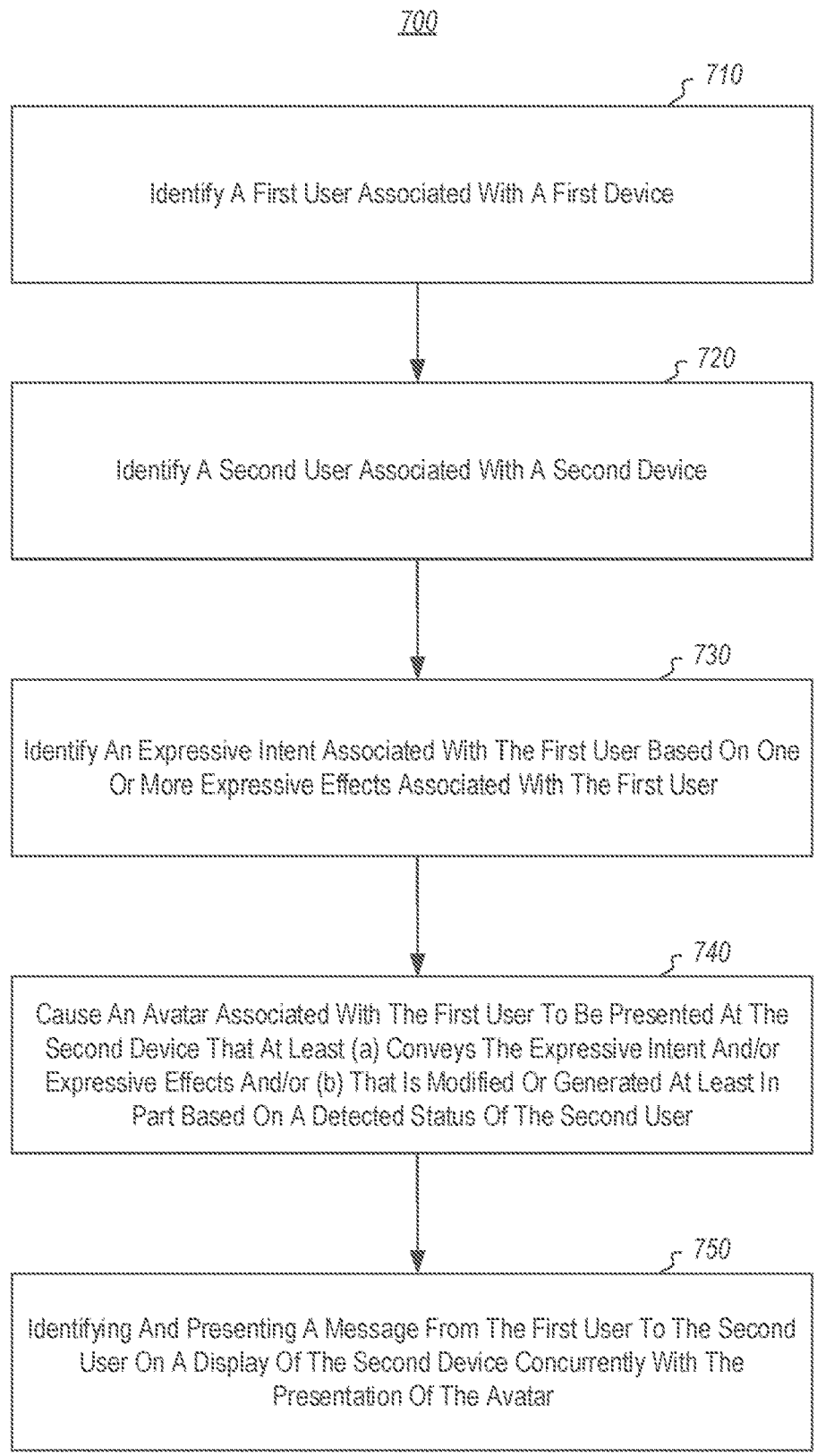

The acts referenced in the flow diagrams 600 and 700 of FIGS. 6 and 7, respectively, may be implemented using the aforementioned computing systems, such as messaging server system 520 and/or messaging device(s) 510 of FIG. 5.

As shown, the flow diagram 600 includes various acts corresponding to methods for causing an avatar to be generated and presented with messaging in a manner to convey contextual meaning from a message sending user to a message receiving user, such as may be implemented by messaging server system 520. The disclosed acts include identifying a message sending user using a first device that is associated with the message sending user (act 610) and a message receiving user using a second device that is associated with the message receiving user (act 620), as well as a message created at the first device by the messaging sending user to be sent to the second device associated with the message receiving user (act 630).

Prior to delivering the message to the second device, the system may also determine an expressive intent of the message sending user (act 640), wherein the expressive intent is based at least in part on one or more expressive effects/data detected or determined to be associated with the message sending user, and that is contextually relevant and/or contemporaneous to the creation of the message at the first device, as previously described.

The expressive intent or other information used to determine a presentation format for an avatar may also be based at least in part on expressive effect data (e.g., status/state data) associated with the message recipient and/or message recipient device. In some instances, this includes detecting a positioning of the message receiving user relative to the second device (act 650).

In some instances, the message is ultimately presented at the second device to the message receiving user concurrently with and/or separately from the presentation of an avatar associated with the message sender (act 660 and 660). Notably, the avatar is displayed in a manner to convey the expressive intent of the message sending user, and by at least causing the presentation of the avatar to be based on a detected positioning of the message receiving user relative to the second device and/or based on other status/state information associated with the message sending and/or receiving users.

In some instances, the detected positioning of the message receiving user relative to the second device is detected prior to presenting the message and/or avatar.

In some instances, the detected positioning of the message receiving user relative to the second device is positioning information detected during presenting the message.

In some instances, the presentation of the avatar includes a formatting and/or positioning of the avatar to face a detected position of the message receiving user relative to the second device.

In some instances, the presentation of the avatar and/or the message is temporarily delayed/paused while the message receiving user is in a first position relative to the second device and until the message receiving user is in a second positing relative to the second device, at which point the delay/pause is ended and the message/avatar presentation is provided. This presentation may include generating a new avatar and/or modifying an existing or previous avatar presentation on the message receiving user device.

In some instances, the detected positioning of the message recipient corresponds to a gaze direction of a user (e.g., message receiving user) based on eye positioning of the message receiving user.

In some instances, the message created by the message sender is presented at the second device (e.g., message receiving user device) concurrently with, but separately from, the presentation of the avatar at the second device.

In some instances, the message is presented by the avatar at the second device, such as by animating the avatar to convey the message effective effects and/or to simulate talking that corresponds with the textual and/or audio presentation of the message content.

In some embodiments, a messaging service system detects an environmental context associated with a physical location of the first device and the message sending user and causes the avatar associated with the message sending user to be presented with visual elements that convey the environmental context associated with the physical location of the first device and/or the message sending user.

In some instances, an environmental context associated with a virtual location corresponding to the message sending user is detected and used to select and/or modify a presentation of an avatar associated with the message sending user, by using visual elements that convey the environmental context associated with the virtual location corresponding to the message sending user.

In some instances, an environmental context associated with an event context associated with the message sending user is detected and used to select and/or modify a presentation of an avatar associated with the message sending user, by using visual elements that convey the event context associated with the virtual location corresponding to the message sending user.

In some embodiments a messaging service system is used to cause the presentation of the referenced avatar(s) in a manner to convey the expressive intent of a message sender at the second device prior to presenting the message at the second device.

In some embodiments, a messaging service system detects facial expression data of the message sending user, the facial expressions comprising the one or more expressive effects. The system also identifies a mapping of the facial expressions to one or more stored expressive intent profiles and uses the one or more expressive intent profiles mapped to the facial expressions to select, modify and/or otherwise control the presentation of the avatar at the second device to convey the expressive intent associated with the facial expressions and/or other expressive effect data.

In some embodiments, a messaging service system detects gesture data of the message sending user, such as body gestures detected by sensors at the device(s) used by the message sending user. These body gestures comprise one example of expressive effects. The system then identifies a mapping of the body gestures to one or more stored expressive intent profiles and uses the one or more expressive intent profiles mapped to the body gestures to control the presentation of the avatar at the second device to convey the expressive intent associated with the body gestures of the message sending user.

In some instances, a messaging service system detects one or more voice patterns of a message sending user that comprise non-limiting examples of expressive effects. The system also identifies a mapping of the one or more voice patterns to one or more stored expressive intent profiles and uses the one or more expressive intent profiles mapped to the one or more voice patterns to control the presentation of the avatar at the second device to convey the expressive intent associated with the voice patterns of the message sending user.

In some embodiments, a messaging service system is used to detect one or more language patterns of the message sending user in a message created by the message sending user, wherein the one or more language patterns comprise one or more expressive effects. The messaging service system is also used to identify a mapping of mapping the one or more language patterns to one or more stored expressive intent profiles and to use the one or more expressive intent profiles mapped to the one or more language patterns to control the presentation of the avatar at the second device to convey the expressive intent associated with the language pattern(s).

In some embodiments, a messaging service system is used to detect user input from the message sending user that selects a particular desired expressive intent that is selected from a plurality of selectable desired expressive intents, the detected user input comprising the one or more expressive effects. The messaging service system also identifies a mapping of mapping the particular desired expressive intent to one or more stored expressive intent profiles and uses the one or more expressive intent profiles mapped to the desired expressive intent to control the presentation of the avatar at the second device to convey the expressive intent associated with the user input and/or other detected expressive effect data.

In some the messaging service system causes the avatar associated with the message sending user to convey expressive intent with the avatar at the second device with gestures and/or animations or other effects that are different than the expressive effects detected from devices associated with the message sending user.

In some embodiments, a messaging service system performs a method for causing an avatar to be generated and presented with messaging in a manner to convey contextual meaning from a message sending user to a message receiving user by first identifying a message sending user using a first device that is associated with the message sending user and a message receiving user using a second device that is associated with the message receiving user and a message created at the first device by the messaging sending user to be sent to the second device associated with the message receiving user.

Then, prior to delivering and/or causing the message to be delivered to the second device, the messaging service system determines an expressive intent of the message sending user, the expressive intent being based at least in part on one or more expressive effects detected from the message sending user. The expressive intent may be temporally contemporaneous with the creation of the message at the first device or temporally sequential to the creation of the message creation.

The messaging service system may also detect a positioning of the message receiving user relative to the second device and/or other status/state information of the message receiving user/device.

In some instances, the messaging service system causes the message and/or a related avatar to be presented at the second device for the message receiving user. The presentation format selected for rendering the avatar, to generate the avatar and/or to modify a previously displayed avatar presentation, is made to in a manner to convey the expressive intent of the message sending user, and by at least causing the presentation of the avatar to be based on a detected state/status of the message receiving user, such as positioning state information or other state/status information.

In many of the disclosed embodiments, an avatar is caused to be presented at a messaging display that at least (a) conveys an expressive intent and/or expressive effects associated with a messaging participant associated with the avatar and/or (b) that is modified or generated at least in part based on a detected status of a messaging participant associated with the avatar.

For instance, as shown in the flow diagram 700 of FIG. 7, a messaging service system performs a method for causing an avatar to be generated and presented with messaging in a manner to convey contextual meaning from a message sending user to a message receiving user by first identifying a first user associated with a first device (act 710), a second user associated with a second device (act 720), and an expressive intent associated with the first user based on one or more expressive effects associated with the first user (act 730). The messaging service system also causes an avatar associated with the first user to be presented at the second device that at least (a) conveys the expressive intent and/or expressive effect(s) and/or (b) that is modified or generated at least in part based on the detected status or other expressive effect data of the second user/user device (act 740). In some instances, the messaging service system also identifies and presents a message from the first user to the second user on a display of the second device concurrently with and/or sequential to the presentation of the avatar (act 750).

It will be appreciated that the disclosed methods may be practiced by a computer system including one or more processors and computer-readable media such as computer memory. In particular, the computer memory may store computer-executable instructions that when executed by one or more processors cause various functions to be performed, such as the acts recited in the embodiments.

For instance, it will be appreciated that the disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as random-access memory (RAM), read-only memory (ROM), electrically erasable programmable read-only memory (EEPROM), compact disc read-only memory (CD-ROM), solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network personal computers (PCs), minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g. as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for causing an avatar to be generated and presented with messaging in a manner to convey contextual meaning from a message sending user to a message receiving user, the system comprising:
   one or more processors; and
   one or more hardware storage devices that store instructions that are executable by the one or more processors to configure the system to:
      identify the message sending user using a first device that is associated with the message sending user;
      identify the message receiving user using a second device that is associated with the message receiving user;
      identify a message created at the first device by the messaging sending user to be sent to the second device associated with the message receiving user;
      prior to delivering the message to the second device, determine an expressive intent of the message sending user, the expressive intent being based at least in part on one or more expressive effects detected from the message sending user contemporaneous with creation of the message at the first device;
      detect a positioning of the message receiving user relative to the second device; and
      cause the message to be presented at the second device to the message receiving user, the message being presented with a display of the avatar, the avatar being displayed in a manner to convey the expressive intent of the message sending user, and by at least causing presentation of the avatar to be based on the detected positioning of the message receiving user relative to the second device,
      wherein the avatar and the message are displayed simultaneously with (i) a copy of a previous avatar that is associated with a previous message and (ii) the previous message,
      wherein, while the avatar displays the expressive intent of the message, the copy of the previous avatar simultaneously animates a previous expressive intent that is associated with the previous message, and
      wherein rendering of the avatar is based on a gaze direction of the message receiving user such that the avatar is rendered when the message receiving user's gaze direction is directed toward the second device and such that the rendering of the avatar is paused when the message receiving user's gaze direction is directed away from the second device.

2. The system of claim 1, wherein the detected positioning of the message receiving user relative to the second device is positioning information detected prior to presenting the message.

3. The system of claim 1, wherein the detected positioning of the message receiving user relative to the second device is positioning information detected during presenting the message.

4. The system of claim 1, wherein the presentation of the avatar includes a positioning of the avatar to face the detected positioning of the message receiving user relative to the second device.

5. The system of claim 1, wherein the presentation of the avatar and the message includes temporarily pausing the presentation of the message while the message receiving user is in a first position relative to the second device and unpausing the presentation of the message while the message receiving user is in a second positing relative to the second device.

6. The system of claim 5, wherein the detected positioning corresponds to the gaze direction based on eye positioning of the message receiving user.

7. The system of claim 1, wherein the message is presented at the second device concurrently with, but separately from, the presentation of the avatar at the second device.

8. The system of claim 1, wherein the message is presented by the avatar at the second device.

9. The system of claim 1, wherein the instructions are further executable by the one or more processors to configure the system to:
   detect an environmental context associated with a physical location of the first device and the message sending user; and
   presenting the avatar with visual elements that convey the environmental context associated with the physical location of the first device and the message sending user.

10. The system of claim 1, wherein the instructions are further executable by the one or more processors to configure the system to:
    detect an environmental context associated with a virtual location corresponding to the message sending user; and
    presenting the avatar with visual elements that convey the environmental context associated with the virtual location corresponding to the message sending user.

11. The system of claim 1, wherein the instructions are further executable by the one or more processors to configure the system to:
    detect an event context associated with the message sending user; and
    presenting the avatar with visual elements that convey the event context associated with the message sending user during presentation of the message.

12. The system of claim 1, wherein the instructions are further executable by the one or more processors to configure the system to:
    cause the presentation of the avatar in a manner to convey the expressive intent at the second device prior to presenting the message at the second device.

13. The system of claim 1, wherein the instructions are further executable by the one or more processors to configure the system to:
    detect facial expressions of the message sending user, the facial expressions comprising the one or more expressive effects;
    identifying a mapping of the facial expressions to one or more stored expressive intent profiles; and
    using the one or more stored expressive intent profiles mapped to the facial expressions to control the presentation of the avatar at the second device to convey the expressive intent.

14. The system of claim 1, wherein the instructions are further executable by the one or more processors to configure the system to:
    detect body gestures of the message sending user, the body gestures comprising the one or more expressive effects;
    identifying a mapping of the body gestures to one or more stored expressive intent profiles; and
    using the one or more stored expressive intent profiles mapped to the body gestures to control the presentation of the avatar at the second device to convey the expressive intent.

15. The system of claim 1, wherein the instructions are further executable by the one or more processors to configure the system to:
    detect one or more voice patterns of the message sending user, the one or more voice patterns comprising the one or more expressive effects;
    identifying a mapping of the one or more voice patterns to one or more stored expressive intent profiles; and
    using the one or more stored expressive intent profiles mapped to the one or more voice patterns to control the presentation of the avatar at the second device to convey the expressive intent.

16. The system of claim 1, wherein the instructions are further executable by the one or more processors to configure the system to:
    detect one or more language patterns of the message sending user in the message, the one or more language patterns comprising the one or more expressive effects;
    identifying a mapping of mapping the one or more language patterns to one or more stored expressive intent profiles; and
    using the one or more stored expressive intent profiles mapped to the one or more language patterns to control the presentation of the avatar at the second device to convey the expressive intent.

17. The system of claim 1, wherein the instructions are further executable by the one or more processors to configure the system to:
    detect user input from the message sending user that selects a particular desired expressive intent that is selected from a plurality of selectable desired expressive intents, the detected user input comprising the one or more expressive effects;
    identifying a mapping of mapping the particular desired expressive intent to one or more stored expressive intent profiles; and
    using the one or more stored expressive intent profiles mapped to the desired expressive intent to control the presentation of the avatar at the second device to convey the expressive intent.

18. The system of claim 1, wherein the instructions are further executable by the one or more processors to configure the system to:
    cause the avatar to convey the expressive intent at the second device audibly.

19. The system of claim 1, wherein the instructions are further executable by the one or more processors to configure the system to:

cause the avatar to convey the expressive intent at the second device with gestures that are different than the one or more expressive effects detected from the message sending user.

20. A method for causing an avatar to be generated and presented with messaging in a manner to convey contextual meaning from a message sending user to a message receiving user, the method comprising:

identifying the message sending user using a first device that is associated with the message sending user;

identifying the message receiving user using a second device that is associated with the message receiving user;

identifying a message created at the first device by the messaging sending user to be sent to the second device associated with the message receiving user;

prior to delivering the message to the second device, determining an expressive intent of the message sending user, the expressive intent being based at least in part on one or more expressive effects detected from the message sending user contemporaneous with creation of the message at the first device;

detecting a positioning of the message receiving user relative to the second device; and causing the message to be presented at the second device to the message receiving user, the message being presented with a display of the avatar, the avatar being displayed in a manner to convey the expressive intent of the message sending user, and by at least causing presentation of the avatar to be based on the detected positioning of the message receiving user relative to the second device, wherein the avatar and the message are displayed simultaneously with (i) a copy of a previous avatar that is associated with a previous message and (ii) the previous message, wherein, while the avatar displays the expressive intent of the message, the copy of the previous avatar simultaneously animates a previous expressive intent that is associated with the previous message, and wherein rendering of the avatar is based on a gaze direction of the message receiving user such that the avatar is rendered when the message receiving user's gaze direction is directed toward the second device and such that the rendering of the avatar is paused when the message receiving user's gaze direction is directed away from the second device.

* * * * *